United States Patent
Enomoto

(10) Patent No.: US 9,694,684 B2
(45) Date of Patent: Jul. 4, 2017

(54) PRIORITY BASED POWER MANAGEMENT SYSTEM AND METHOD FOR AN ELECTRIC VEHICLE

(71) Applicant: Honda Motor Co., Ltd., Minato-ku, Tokyo (JP)

(72) Inventor: Tomoyuki Enomoto, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 14/559,541

(22) Filed: Dec. 3, 2014

(65) Prior Publication Data
US 2016/0159220 A1 Jun. 9, 2016

(51) Int. Cl.
*B60L 9/00* (2006.01)
*B60L 1/00* (2006.01)
(Continued)

(52) U.S. Cl.
CPC ............ *B60L 1/006* (2013.01); *B60L 11/1861* (2013.01); *B60W 10/06* (2013.01); *B60W 10/08* (2013.01); *B60W 10/26* (2013.01); *B60W 20/10* (2013.01); *B60W 30/18054* (2013.01); *B60W 2050/009* (2013.01); *B60W 2510/244* (2013.01); *Y02T 10/6269* (2013.01); *Y02T 10/6286* (2013.01)

(58) Field of Classification Search
USPC ..... 180/65.21; 320/134–135, 162, 164, 109; 701/22
See application file for complete search history.

(56) References Cited

U.S. PATENT DOCUMENTS

| 7,245,044 B2 | 7/2007 | Woltereck et al. |
| 7,273,120 B2 | 9/2007 | Tabata |
(Continued)

FOREIGN PATENT DOCUMENTS

| JP | 2007230385 | 9/2007 |
| WO | WO2010/143281 | * 12/2010 |

OTHER PUBLICATIONS

A Dual Purpose Triangular Neural Network Based Module for Monitoring and Protection in Bi-Directional Off-Board Level-3 Charging of EV/PHEV; Xiaomin Lu; Iyer, K.L.V.; Mukherjee, K.; Kar, N.C.; Smart Grid, IEEE Transactions on Year: 2012, vol. 3, Issue: 4; pp. 1670-1678, DOI: 10.1109/TSG.2012.2205950.*
(Continued)

*Primary Examiner* — Cuong H Nguyen
(74) *Attorney, Agent, or Firm* — Arent Fox LLP

(57) ABSTRACT

A method to provide priority based power management of off-board devices being power by a vehicle comprising: determining an operating mode of the vehicle, the operating mode being an electric operating mode or a fossil fuel operating mode; determining a current state of charge (SOC) of a battery pack of the vehicle; supplying power to the off-board devices when the current SOC of the battery pack is above a minimum threshold value when the vehicle is operating in the fossil fuel operating mode; prioritizing the off-board devices when the vehicle is operating in the electric operating mode; and powering the off-board devices based on a prioritization level of the off-board devices and the current SOC of the battery pack when the vehicle is operating in the electric operating mode.

16 Claims, 3 Drawing Sheets

(51) Int. Cl.
| | |
|---|---|
| B60L 11/18 | (2006.01) |
| B60W 10/06 | (2006.01) |
| B60W 10/08 | (2006.01) |
| B60W 10/26 | (2006.01) |
| B60W 30/18 | (2012.01) |
| B60W 20/10 | (2016.01) |
| B60W 50/00 | (2006.01) |

(56) References Cited

U.S. PATENT DOCUMENTS

| | | | | |
|---|---|---|---|---|
| 7,276,815 | B2 | 10/2007 | Algrain et al. | |
| 7,863,769 | B2 | 1/2011 | Busdiecker et al. | |
| 7,948,113 | B2 | 5/2011 | Abe | |
| 8,116,915 | B2* | 2/2012 | Kempton | B60L 11/1824 |
| | | | | 180/65.1 |
| 8,261,868 | B2 | 9/2012 | Goenka et al. | |
| 8,473,136 | B2* | 6/2013 | Kato | B60W 10/26 |
| | | | | 180/65.21 |
| 8,626,367 | B2 | 1/2014 | Krueger et al. | |
| 8,796,881 | B2* | 8/2014 | Davis | B60L 11/1842 |
| | | | | 307/69 |
| 9,283,862 | B2* | 3/2016 | Bridges | B60L 11/1842 |
| 2008/0224663 | A1 | 9/2008 | Mack | |
| 2009/0222143 | A1* | 9/2009 | Kempton | B60L 11/1824 |
| | | | | 700/291 |
| 2010/0270968 | A1* | 10/2010 | Reese | B60L 11/1851 |
| | | | | 320/103 |
| 2011/0004358 | A1* | 1/2011 | Pollack | B60L 11/1842 |
| | | | | 700/297 |
| 2011/0301790 | A1 | 12/2011 | Atluri et al. | |
| 2012/0109442 | A1* | 5/2012 | Kato | B60W 10/26 |
| | | | | 701/22 |
| 2013/0217409 | A1* | 8/2013 | Bridges | B60L 11/1842 |
| | | | | 455/456.1 |
| 2013/0342167 | A1 | 12/2013 | Bissontz | |
| 2015/0032301 | A1* | 1/2015 | Lamba | B61C 7/04 |
| | | | | 701/19 |
| 2015/0197163 | A1* | 7/2015 | Loftus et al. | 320/134 |
| 2015/0202976 | A1* | 7/2015 | Bridges | B60L 11/1842 |
| | | | | 320/109 |
| 2015/0360678 | A1* | 12/2015 | Le Roy | B60W 20/1088 |
| | | | | 701/22 |

OTHER PUBLICATIONS

Power management solutions for hybrid electric vehicles; Onea, A.; Babici, C.; Electrical and Electronics Engineering (ISEEE), 2013 4th International Symposium on; Year: 2013; pp. 1-8, DOI: 10.1109/ISEEE.2013.6674376.*

A Practical and Accurate SOC Estimation System for Lithium-Ion Batteries by EKF ; Lin, L.; Kawarabayashi, N.; Fukui, M.; Tsukiyama, S.; Shirakawa, I.; Vehicle Power and Propulsion Conference (VPPC), 2014 IEEE; Year: 2014; pp. 1-6, DOI: 10.1109/VPPC.2014.7007006.*

Start-up capabilities of photovoltaic module for the International Space Station; Hajela, G.; Hague, L; Energy Conversion Engineering Conference, 1997. IECEC-97., Proceedings of the 32nd Intersociety; Year: 1997, vol. 1 pp. 509-514 vol. 1, DOI: 10.1109/IECEC.1997.659241.*

Optimal energy management of a hybrid electric bus with a battery-supercapacitor storage system using genetic algorithm Herrera, V.I.; Saez-de-Ibarra, A.; Milo, A.; Gaztanaga, H.; Camblong, H.;Electrical Systems for Aircraft, Railway, Ship Propulsion and Road Vehicles (ESARS), 2015 Inter. Conf.; pp. 1-6, DOI: 10.1109/ESARS.2015.7101452.*

Control strategy in hybrid electric vehicle using fuzzy logic controller; Majdi, L.; Ghaffari, A.; Fatehi, N.; Robotics and Biomimetics (ROBIO), 2009 IEEE Inter. Conf.; Year: 2009; pp. 842-847, DOI: 10.1109/ROBIO.2009.5420563.*

Trip based optimal power management of plug-in hybrid electric vehicles using gas-kinetic traffic flow model; Qiuming Gong; Yaoyu Li; Zhong-Ren Peng; 2008 American Control Conference; Year: 2008; pp. 3225-3230, DOI: 10.1109/ACC.2008.4586989.*

Power Management Strategy of a Single Converter Hybrid Electrical System Based on Battery and Super Capacitors; K. S. Agbli; M. Hilairet; O. Bossard; F. Gustin; Vehicle Power and Propulsion Conference (VPPC), 2015 IEEE; Year: 2015 pp. 1-6, DOI: 10.1109/VPPC.2015.7352996.*

A transient enhanced external capacitor-less LDO with a CMOS only sub-bandgap voltage reference; Chang-Bum Park; Chan-Kyeong Jung; Shin-Il Lim; 2016 International SoC Design Conference (ISOCC) ; Year: 2016; pp. 251-252, DOI: 10.1109/ISOCC.2016.7799772.*

Low complexity, real-time adjusted power management policy using Golden Section Search; Tomas Scherrer; Soo-Yong Kim; Chaehag Yi ; 2013 International SoC Design Conference (ISOCC); Year: 2013; pp. 229-232, DOI: 10.1109/ISOCC.2013.6864014.*

Plug-in Hybrid Electric Vehicles—Power Electronics, Battery Management, Control, Optimization and V2G MI, C.; University of Michigan, USA Published in: Industrial Electronics, 2009. ISIE 2009. IEEE International Symposium Date: Jul. 5-8, 2009.

Supervisory Power Management Control Algorithms for Hybrid Electric Vehicles: A Survey Malikopoulos, A.A. Energy and Transportation Science Division, Oak Ridge National Laboratory, Oak Ridge, TN 37831 USA Published in: Intelligent Transportation Systems, IEEE Transactions, vol. PP, Issue: 99, pp. 1-17.

* cited by examiner

PRIORITY BASED POWER MANAGEMENT SYSTEM AND METHOD FOR AN ELECTRIC VEHICLE

FIELD

The present application generally relates to an electric vehicle, and, more particularly, to a Plug-in Hybrid Electric Vehicle (PHEV) having a system and method to provide priority based multi-tiered power management of power supplied by the PHEV to off-board devices.

BACKGROUND

A plug-in hybrid electric vehicle (PHEV) is a hybrid vehicle which may have an electric motor and an internal combustion engine (ICE). The PHEV may use rechargeable batteries, or other energy storage devices (hereinafter rechargeable batteries), that may be restored to full charge by connecting the rechargeable batteries via a plug to an external electric power source such as an electric wall socket. The rechargeable batteries may also be recharged through operation of the ICE.

PHEVs may operated primarily by electric propulsion. The ICE may be used to assist vehicle propulsion in limited circumstances such as high speed and/or high power demand operations due to system constraints. The ICE may further be used after the usable power stored in the rechargeable batteries has depleted. By relying on electrical energy from the grid to charge the battery and then using that energy for a significant fraction of vehicle travel, the amount of fuel consumed by the PHEV is greatly reduced, especially when the traveling distance is close to the primary PHEV range.

PHEVs may have on-board and off-board power consuming systems and/or devices (hereinafter on-board systems and off-board systems), in addition to the PHEV drive systems. On-board systems may include vehicle safety systems and sensors, vehicle lighting, heating ventilation and cooling (HVAC) systems of the vehicle, vehicle telematic systems, vehicle radio and entertainment devices, as well as other on-board systems. An off-board system may be defined as a power consuming system that may be coupled to the PHEV as an aftermarket accessory, or a system that may draw power from the vehicle through a vehicle 12 volt outlet, USB port, or via a direct connection to the vehicle power supply terminals. The power demand of the aforementioned vehicle on-board systems and off-board systems may limit the operating range of the PHEV, and cause undue strain on the vehicle's power supply and energy storage devices.

PHEVs may have a power management system (PMS) to distribute vehicle power demand between the different on-board power usage systems. However, both on-board systems and off-board systems may have different priorities in order to conserve and maximize battery power and ensure crucial vehicle devices maintain operation while retaining enough battery power for the PHEV to propel. While the PMS of the PHEV may control the distribution of vehicle power between the different on-board systems, power management of off-board systems is presently not supported.

Therefore, it would be desirable to provide a system and method that overcome the above identified concerns, as well as additional challenges which will become apparent from the disclosure set forth below.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a method to provide priority based power management of off-board devices being power by a vehicle is disclosed. The method comprises: determining an operating mode of the vehicle, the operating mode being an electric operating mode or a fossil fuel operating mode; determining a current state of charge (SOC) of a battery pack of the vehicle; supplying power to the off-board devices when the current SOC of the battery pack is above a minimum threshold value when the vehicle is operating in the fossil fuel operating mode; prioritizing the off-board devices when the vehicle is operating in the electric operating mode; and powering the off-board devices based on a prioritization level of the off-board devices and the current SOC of the battery pack when the vehicle is operating in the electric operating mode.

In accordance with one aspect of the present application, a system to provide priority based power management of off-board devices is disclosed. The system has an electric motor. A battery pack is coupled to the electric motor. An internal combustion engine (ICE) is coupled to the battery pack. A control module is coupled to the electric motor and the ICE. The control module has at least one processor. A memory is coupled to the processor. The memory stores program instructions that when executed by the processor, causes the processor to: determine an operating mode of the vehicle, the operating mode being an electric operating mode or a fossil fuel operating mode; and power the off-board devices based on a prioritization level of the off-board devices and current state of charge (SOC) of the battery pack.

In accordance with one aspect of the present application, a system to provide priority based power management of off-board devices is disclosed. The system has an electric motor. A battery pack is coupled to the electric motor. An internal combustion engine (ICE) is coupled to the battery pack. A control module is coupled to the electric motor and the ICE. The control module has at least one processor. A memory is coupled to the processor. The memory stores program instructions that when executed by the processor, causes the processor to: determine an operating mode of the vehicle, the operating mode being an electric operating mode or a fossil fuel operating mode; determine a current state of charge (SOC) of the battery pack; supply power to the off-board devices when the current SOC of the battery pack is above a minimum threshold value when the vehicle is operating in the fossil fuel operating mode; prioritize the off-board devices when the vehicle is operating in the electric operating mode; and power the off-board devices based on a prioritization level of the off-board devices and the current SOC of the battery pack when the vehicle is operating in the electric operating mode.

BRIEF DESCRIPTION OF DRAWINGS

Embodiments of the disclosure will become more fully understood from the detailed description and the accompanying drawings, wherein.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
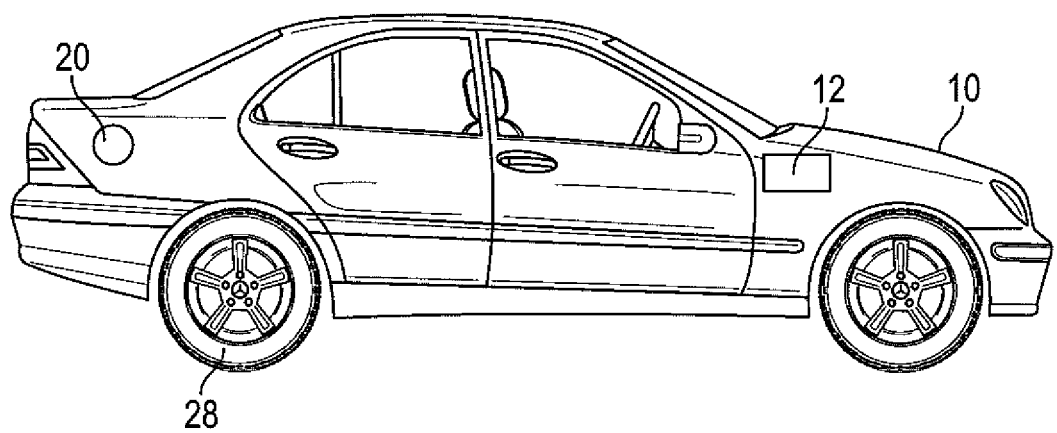
FIG. 1 is an elevated perspective view of a vehicle implementing an exemplary system and method for priority based power management of off-board devices powered by the vehicle in accordance with one aspect of the present application.

Referring to FIG. 1, an exemplary Plug-in Hybrid Electric Vehicle (PHEV) 10 is shown. The PHEV 10 may be equipped with a system 12. The system 12 may be used to control power distribution to on-board and off-board systems of the PHEV 10. The system 12 may differentiate between a fossil fuel operating mode and an electric operating mode of the PHEV 10 in order to determine priority rules, based on the operating mode, for distributing power to the on-board systems and off-board systems of the PHEV 10. For example, if the PHEV 10 is operating in an electric operating mode, a priority power distribution scheme may be established for a plurality of off-board systems, where if a state of charge (SOC) is below a predetermined minimum threshold, individual off-board systems may be selected for power. In this case, the scheme may be based on an emergency type level such that one or more of the plurality of off-board systems may be powered, but other off-board systems deemed non-essential may not be powered. If the PHEV 10 is operating in a fossil fuel operating mode and a battery pack of the PHEV 10 is not fully charged, a priority scheme may be implemented where only essential off-board systems may be supplied power until the battery pack is recharged to a predefined level.

Figure 2:
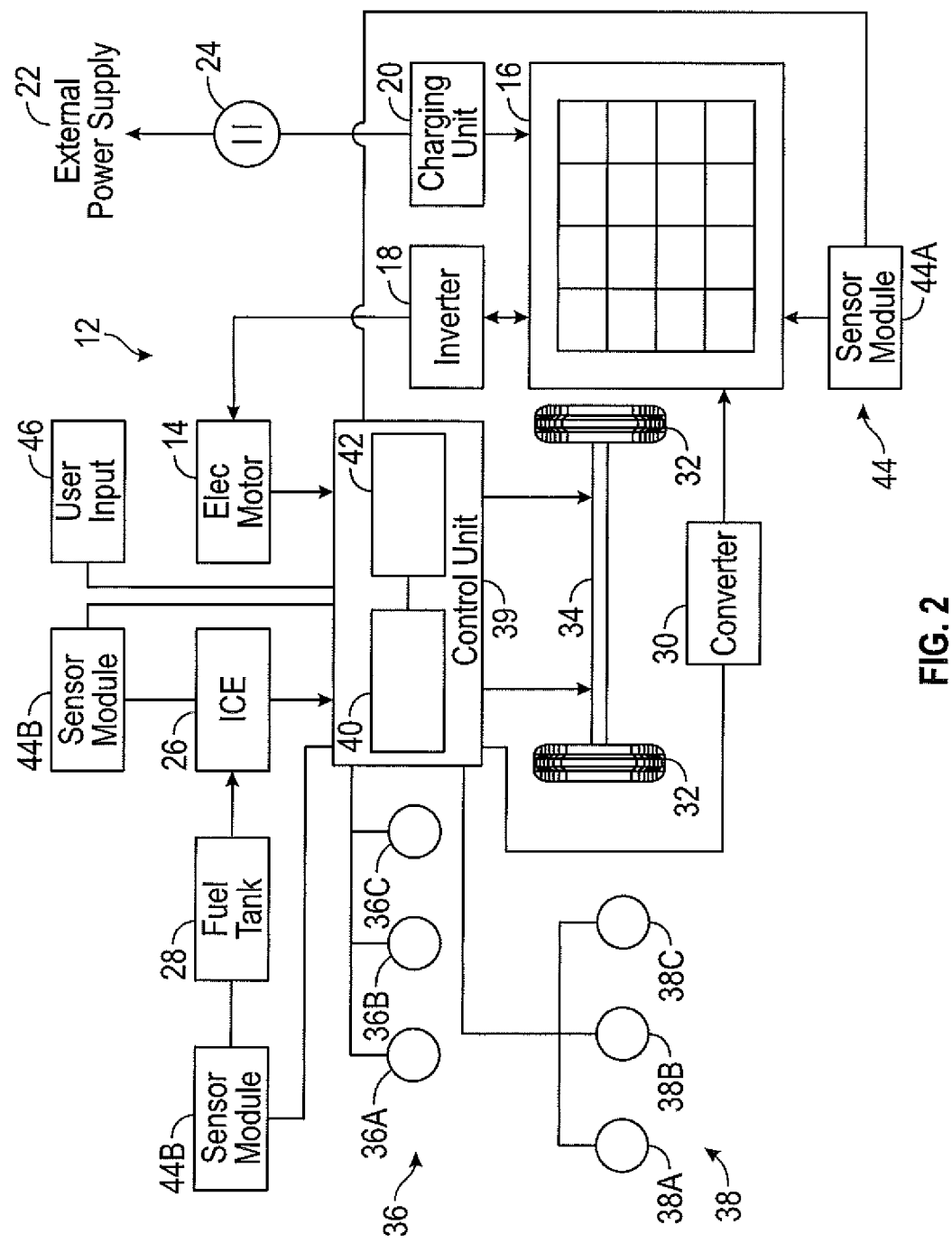
FIG. 2 is a simplified functional block diagram of the system for priority based power management of off-board devices powered by the vehicle depicted in FIG. 1 in accordance with one aspect of the present application.

Referring now to FIGS. 1 and 2, the system 12 in the PHEV 10 may be seen. The system 12 may have an electric motor 14. The electric motor 14 may be used for propelling the PHEV 10. The electric motor 14 may be used as the main source of propulsion by the PHEV 10.

The system 12 may have a battery pack 16. The battery pack 16 may be used to power the electric motor 14. The battery pack 16 may be coupled to the electric motor 14 through an inverter 18. The inverter 18 may be used to convert DC current from the battery pack 16 to an AC current for powering the electric motor 14.

The system 12 may have a charging device 20. The battery back 16 may be coupled to a charging unit 20. The charging unit 20 may be used to recharge the battery pack 16 when the charging unit 20 is connected to an external power supply 22 such as an electric power grid or the like. The charging unit 20 may be used to convert the AC power from the external power supply 22 to DC power for charging the battery back 16. A connector 24 may be coupled to the changing device 20. The connector 20 may be used to couple the external power supply 22 to the charging device 20.

The system 12 may have an internal combustion engine (ICE) 26. The ICE 26 may be used to assist propulsion of the PHEV 10. The ICE 26 may be used in circumstances such as high speed and/or high power demand operations due to system constraints. The ICE 26 may be used to power the PHEV 10 when the battery pack 16 has limited and/or no energy to power the electric motor 14. The ICE 26 may be coupled to a fuel tank 28. The fuel tank 28 may be used to store combustible material for powering the ICE 26.

The ICE 26 may be used to recharge the battery pack 16. When the ICE 26 is running, power from the ICE 26 may be used to recharge the battery pack 16. A converter 30 or similar device may be positioned between the ICE 26 and the battery pack 16. The converter 30 may be used to convert the energy from the ICE 26 to DC power for charging the battery back 16.

The electric motor 14 and the ICE 26 may be used to provide power to rotate drive wheels 32 of the PHEV 10 through a drive train 34. The drive train 34 may be used to deliver power generated by the electric motor 14 and or the ICE 16 to rotate the drive wheels 28.

A control unit 39 may be coupled to the electric motor 14, the ICE 26, the converter 30 and the drive train 34. The control unit 39 may be used to control power distribution to the drive train 34. One or more on-board systems 36 and one or more off-board systems 38 of the PHEV 10 may be coupled to the control unit 39. While three on-board systems 36A-36C and three off-board systems 38A-38C may be shown in FIG. 2, this is shown as an example. The system 12 may have any number of on-board systems 36 and off-board systems 38. The control unit 39 may be may be used to control power distribution to the drive train 34, the on-board systems 39 and the off-board systems 38.

The control unit 39 may have a processor 40. The processor 40 may be implemented in hardware, software or a combination thereof. The processor 40 may store a computer program or other programming instructions associated with a memory 42 to control the operation of the control unit 39. The data structures and code within the software in which the present disclosure may be implemented, may be stored on a non-transitory computer-readable storage. The non-transitory computer-readable storage may be any device or medium that may store code and/or data for use by a computer system. The non-transitory computer-readable storage medium may include, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor 40 may comprise various computing elements, such as integrated circuits, microcontrollers, microprocessors, programmable logic devices, etc, alone or in combination to perform the operations described herein.

The system 12 may have one of the monitoring sensors 44. At least one sensor 44A may be coupled to the battery pack 16 of the vehicle 10. The monitoring sensor 44A may be used for monitoring the current charge state of charge of the battery pack 16, charging status of the battery pack 16, and operating conditions of the battery pack 16 such as those that may affect battery degradation. Other sensors 44B may be used to monitor the operating statuses and levels of other systems within the vehicle 10. In accordance with one embodiment, the sensors 44B may be used to monitor the operating statuses and levels of on-board systems 36 within the vehicle 10 such as but not limited to, the fuel tank 28, the ICE 26, the electric motor 14, the inverter 18, the charging unit 20, and other systems of the vehicle 12. The monitoring sensors 44A and 44B may be coupled to the control unit 39.

A user interface 46 may be coupled to the control unit 39. The user interface 46 may allow a user of the system 10 to enter how the off-board systems 38 may be prioritized. For example, if the off-board system 38A was a generator, off-board system 38B was a flashlight, and off-board system 38C was a radio. The user may prioritize the off-board systems 38A-38C wherein the generator is the highest priority, followed by the flashlight and then the radio. The above is given as an example and the user may prioritize the off-board systems 38 in any manner.

The control unit 39 may be used to control power distribution to the on-board systems 36 and off-board systems 38 of the vehicle 10. The control unit 40 may be able to differentiate between a fossil fuel operating mode and an electric operating mode of the vehicle 10 in order to determine priority rules, based on the operating mode, for distributing power to the on-board systems 36 and off-board systems 38.

The control unit 39 may be able to differentiate between a fossil fuel operating mode and an electric operating mode of the vehicle 10. If the vehicle 10 is operating in the fossil fuel operating mode, the ICE 26 may be used to provide power to the drive train 34, the on-board systems 36 and the off-board systems 38. In accordance with one embodiment, the ICE 26 may be used to power the drive train 34, while the converter 30 or other converting devices coupled to the ICE 26 may be used to power the on-board systems 36 and the off-board systems 38.

In the present embodiment, three on-board systems 36A-36C and three off-board systems 38A-38C may be seen. However, this is shown as an example and any number of on-board systems 36 and off-board systems 38 may be powered. In the fossil fuel operating mode, the off-board systems 38 may be assigned equal priority and all may be powered. Thus, in the present embodiment, the off-board systems 38A-38C may be assigned equal priority and all may be powered. The off-board systems 38 may continue to be powered as long as the ICE 26 has fuel to operate.

In accordance with one embodiment, if the vehicle 10 is operating in the fossil fuel operating mode, and the SOC of the battery pack 16 is below a predetermined value, the control unit 39 may prevent the off-board systems 38 from being powered. The control unit 39 may continue to prevent the off-board systems 38 from being powered until the SOC of the battery pack 16 increases above the predetermined value. For example, if the minimum SOC of the battery pack is thirty (30) percent, all of the off-board systems 38 will be powered as long as the SOC of the battery pack 16 remains above thirty (30) percent. However, if the current SOC of the battery pack 16 was twenty five (25) percent, none of the off-board devices 38 may be powered. The off-board systems 38 may remain unpowered until the current SOC rises at or above the minimum SOC of thirty (30) percent.

Alternatively, if the vehicle 10 is operating in the fossil fuel operating mode, and the SOC of the battery pack 16 is below one or more predetermined values, the control unit 39 may prioritize which of the off-board devices 38 are powered. As the SOC of the battery pack 16 increases, the control unit 39 may power additional off-board systems 38. For example, in the above embodiment, the control unit 39 may be configured to not power the off-board systems 38 if the SOC of the battery pack 16 is below thirty (30) percent. If the SOC rises above thirty (30) percent, the control unit 39 may be configured to power the off-board systems 38A. If the SOC rises above fifty (50) percent, the control unit 39 may be configured to power the off-board systems 38A and 38B. If the SOC rises above sixty (60) percent, the control unit 39 may be configured to power the off-board systems 38A-38C. The above is given as an example and other percentages may be used.

If the vehicle 10 is operating in the electric operating mode, the battery pack 16 may be used to provide power to the drive train 34, the on-board systems 36 and the off-board systems 38. In accordance with one embodiment, the electric motor 14 may be used to power the drive train 34, while power from the battery pack 16 may be used to power the on-board systems 36 and the off-board systems 38. A DC-DC converter may be used to converts the DC current from the battery pack 16 from one voltage level to another to power the on-board systems 36 and the off-board systems 38. In the present embodiment, three off-board systems 38A-38C may be seen. However, this is shown as an example and any number of off-board systems 38 may be powered.

In the electric operating mode, the three on-board systems 36A-36C may be assigned differing priority level. The control unit 39 may prioritize which of the off-board systems 38 are powered based on the SOC of the battery pack 16. As the SOC of the battery pack 16 increases and/or decreases, the control unit 39 may add and/or remove different off-board systems 38. For example, in the above embodiment, the control unit 39 may be configured to power all of the off-board systems 38A-38C if the SOC of the battery pack 16 is above eighty (80) percent. If the SOC falls below eighty (80) percent, the control unit 39 may be configured to power the off-board systems 38A and 38B. If the SOC falls below seventy (70) percent, the control unit 39 may be configured to power the off-board system 38A. If the SOC falls below sixty (60) percent, the control unit 39 may be configured to not power any of the off-board systems 38A-38C until the SOC of the battery pack 16 rises above sixty (60) percent. The above is given as an example and other percentages may be used.

Figure 3:
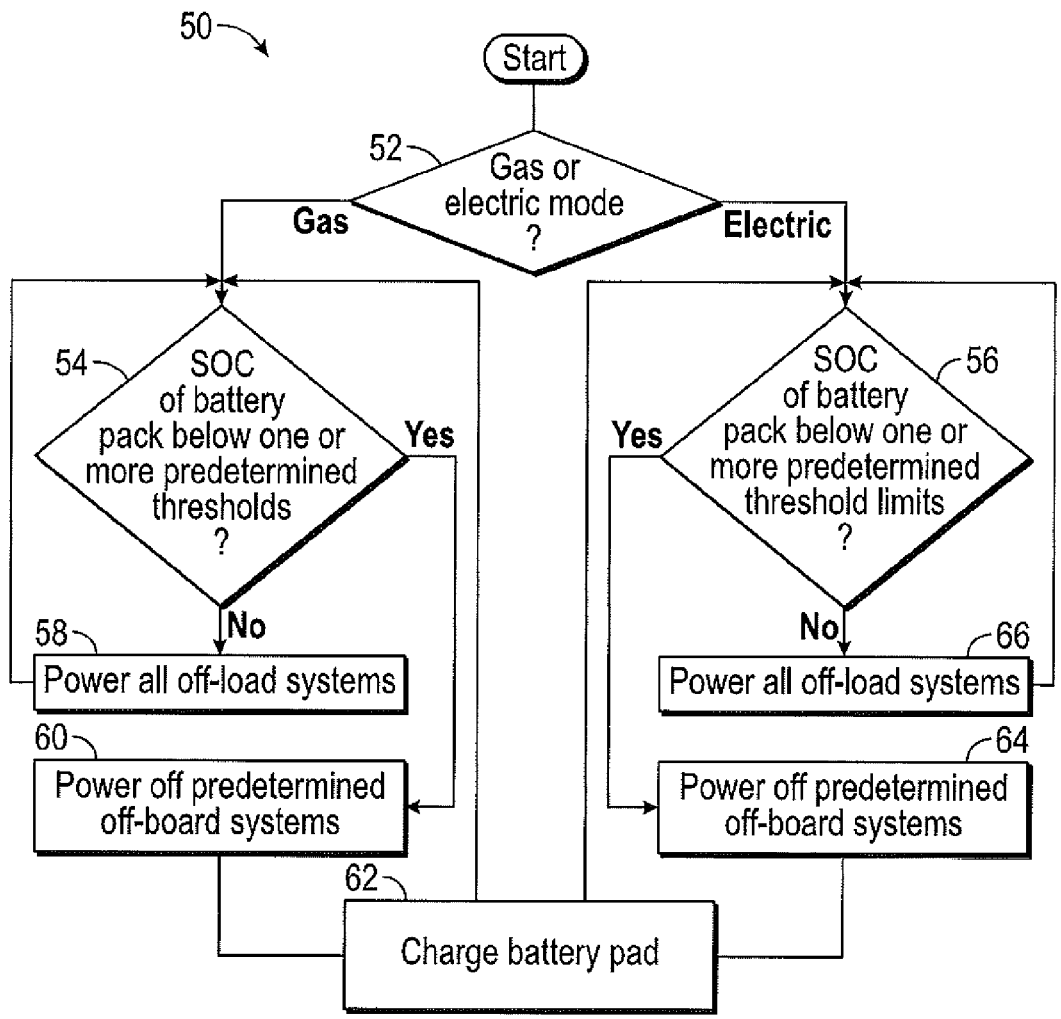
FIG. 3 is an exemplary flowchart depicting an illustrative method of priority based power management of off-board devices powered by the vehicle in according to one aspect of the present application.

Referring now to FIGS. 1-3, operation of the system 12 may be described. The method 50 may start with a determination of the operating mode of the vehicle 10 as shown in block 52. If the vehicle 10 is determined to be in a fossil fuel operating mode, a determination may be made as to whether the SOC of the battery pack 16 is below one or more threshold limits for powering the off-board systems 38 as shown in block 54. In the event the SOC of the battery pack 16 is above the threshold limits, the individual off-board systems 38 may be powered as shown in block 58. The off-board systems 38 may continually be powered unless a determination may be made as to whether the SOC of the battery pack 16 falls below one or more threshold limits for powering the off-board systems 38 as shown in block 54. In the event the SOC of the battery pack 16 is below one or more of the threshold limits, individual off-board systems 38 may not be supplied power and or turned off as shown in block 60 and the battery pack 16 may be charged as shown in block 62. The off-board systems 38 that are not supplied power and or turned off may remain in that state until the SOC of battery pack 16 rises above one or more of the threshold limits as shown in block 54.

If the vehicle 10 is determined to be in an electric operating mode, 62, a determination may be made as to whether the SOC of the battery pack 16 is below one or more threshold limits for powering the off-board systems 38 as shown in block 56. In the event the SOC of the battery pack 16 is above the threshold limits, the individual off-board systems 38 may be powered up to an available maximum current load as shown in block 66. The off-board systems 38 may continually be powered unless a determination may be made as to whether the SOC of the battery pack 16 falls below one or more threshold limits for powering the off-board systems 38 as shown in block 56. In the event the SOC of the battery pack 16 is below one or more of the threshold limits, individual off-board systems 38 may not be supplied power and or turned off as shown in block 64 and the battery pack 16 may be charged as shown in block 62. The off-board systems 38 that are not supplied power and or turned off may remain in that state until the SOC of battery pack 16 rises above one or more of the threshold limits as shown in block 54.

While embodiments of the disclosure have been described in terms of various specific embodiments, those skilled in the art will recognize that the embodiments of the disclosure may be practiced with modifications within the spirit and scope of the claims.

What is claimed is:

1. A method implemented by a control module coupled to an electric motor and an internal combustion engine of a vehicle to provide priority based power management of off-board devices being power by the vehicle, comprising:
   determining, via the control module, an operating mode of the vehicle, the operating mode being an electric operating mode or a fossil fuel operating mode;
   determining, via the control module, a current state of charge (SOC) of a battery pack of the vehicle;
   supplying power at a maximum load of each of the off board devices when the current SOC of the battery pack is above a predetermined threshold value when the vehicle is operating in the fossil fuel operating mode;
   applying, via the control module, at least one priority to each of the off-board devices when the vehicle is operating in the electric operating mode;
   when the current SOC of the battery pack is above the predetermined threshold value and the vehicle is operating in the electric operating mode, powering the off-board devices based on the priority of the off-board devices; and
   when the current SOC of the battery pack falls below the predetermined threshold value and the vehicle is operating in the electric operating mode, removing power from individual off-board devices based on the priority of the off-board devices until the current SOC of the battery pack rises above the predetermined threshold value.

2. The method of claim 1, comprising preventing powering of the off-board devices when the current SOC is below the predetermined threshold value and the vehicle is operating in the electric operating mode.

3. The method of claim 1, comprising:
   updating the priority for each of the off-board devices when the vehicle is operating in the fossil fuel operating mode; and
   powering the off board devices based on the priority of the off-board devices and current SOC of the battery pack when the vehicle is operating in the fossil fuel operating mode.

4. The method of claim 3, comprising powering individual off-board devices as the current SOC rises above predetermine threshold levels when the vehicle is operating in the fossil fuel operating mode.

5. The method of claim 1, further comprising:
   determining whether an off-board device is essential; and
   when the off-board device is essential, assigning a higher priority to off-board device relative to a non-essential off-board device.

6. A system to provide priority based power management of off-board devices being powered by a vehicle comprising:
   an electric motor;
   a battery pack coupled to the electric motor;
   an internal combustion engine (ICE) coupled to the battery pack;
   a control module coupled to the electric motor and the ICE, the control module comprising:
   at least one processor; and
   a memory coupled to the processor, the memory storing program instructions that when executed by the processor, causes the processor to:
   determine an operating mode of the vehicle, the operating mode being an electric operating mode or a fossil fuel operating mode;
   determine a current state of charge (SOC) of the battery pack;
   supply power at a maximum load of each of the off-board devices when the current SOC of the battery pack is above a predetermined threshold value when the vehicle is operating in the fossil fuel operating mode;
   apply at least one priority to each of the off-board devices when the vehicle is operating in the electric operating mode;
   when the current SOC of the battery pack is above the predetermined threshold value and the vehicle is operating in the electric operating mode, power the off-board devices based on the priority of the off-board devices; and
   when the current SOC of the battery pack falls below the predetermined threshold value and the vehicle is operating in the electric operating mode, remove power from individual off-board devices based on the priority of the off-board devices until the current SOC of the battery pack rises above the predetermined threshold value.

7. The method of claim 1, wherein the at least one priority of the off-board devices is inputted with a graphical user interface (GUI).

8. A system to provide priority based power management of off-board devices being powered by a vehicle comprising:
   an electric motor;
   a battery pack coupled to the electric motor;
   an internal combustion engine (ICE) coupled to the battery pack;
   a control module coupled to the electric motor and the ICE, the control module comprising:
   at least one processor; and
   a memory coupled to the processor, the memory storing program instructions that when executed by the processor, causes the processor to:
   determine an operating mode of the vehicle, the operating mode being an electric operating mode or a fossil fuel operating mode;
   determine a current state of charge (SOC) of the battery pack;
   supply power at a maximum load of each of the off-board devices when the current SOC of the battery pack is above a predetermined threshold value when the vehicle is operating in the fossil fuel operating mode;
   apply at least one priority to each of the off-board devices;
   when the current SOC of the battery pack is above the predetermined threshold value and the vehicle is operating in the electric operating mode, power the off-board devices based on the priority of the off-board devices; and when the current SOC of the battery pack falls below the predetermined threshold value and the vehicle is operating in the electric operating mode, remove power from individual off-board devices based on the priority of the off-board devices until the current SOC of the battery pack rises above the predetermined threshold value.

9. The system of claim 8, wherein the memory storing program instructions that when executed by the processor, causes the processor to:
update the priority for each of the off-board devices when the vehicle is operating in the electric operating mode; and
power the off-board devices based on the priority of the off-board devices and the current SOC of the battery pack when the vehicle is operating in the electric operating mode.

10. The system of claim 9, wherein the memory storing program instructions that when executed by the processor, causes the processor to prevent powering of the off-board devices when the current SOC is below the predetermined threshold value and the vehicle is in the electric operating mode.

11. The system of claim 9, wherein the memory storing program instructions that when executed by the processor, causes the processor to: power individual off-board devices as the current SOC rises above predetermine threshold levels when the vehicle is operating in the fossil fuel operating mode.

12. The system of claim 9, wherein the memory storing program instructions that when executed by the processor, causes the processor to:
update the priority for each of the off-board devices when the vehicle is operating in the fossil fuel operating mode; and
power the off-board devices based on the priority of the off-board devices and the current SOC of the battery pack when the vehicle is operating in the fossil fuel operating mode.

13. The system of claim 6, wherein the memory storing program instructions that when executed by the processor, causes the processor to prevent powering of the off-board devices when the current SOC is below the predetermined threshold value and the vehicle is operating in the electric operating mode.

14. The system of claim 6, wherein the memory storing program instructions that when executed by the processor, causes the processor to:
update the priority for each of the off-board devices when the vehicle is operating in the fossil fuel operating mode; and
power the off-board devices based on the priority of the off-board devices and current SOC of the battery pack when the vehicle is operating in the fossil fuel operating mode.

15. The system of claim 9, wherein the at least one priority of the off-board devices is inputted with a graphical user interface (GUI).

16. The system of claim 14, wherein the memory storing program instructions that when executed by the processor, causes the processor to power individual off-board devices based on the priority of the off-board devices as the current SOC rises above predetermine threshold levels when the vehicle is operating in the fossil fuel operating mode.

* * * * *